United States Patent
Lessa

Patent Number: 5,797,208
Date of Patent: Aug. 25, 1998

[54] INFLATABLE FIGURE

[76] Inventor: Roger C. Lessa, 1180 Mason St., Dansville, Mich. 48819

[21] Appl. No.: 777,083

[22] Filed: Dec. 30, 1996

Related U.S. Application Data

[63] Continuation-in-part of Ser. No. 514,604, Aug. 14, 1995, abandoned.

[51] Int. Cl.⁶ ............................................. A01M 31/06
[52] U.S. Cl. ............................................................ 43/2
[58] Field of Search ............................ 43/1–3; 446/220, 446/221, 222, 226; 52/2.25, 2.26

[56] References Cited

U.S. PATENT DOCUMENTS

| | | | |
|---|---|---|---|
| D. 356,620 | 3/1995 | Weber et al. | |
| 1,504,079 | 8/1924 | Roberts | |
| 1,881,048 | 10/1932 | Dorogi et al. | 446/220 |
| 1,970,802 | 8/1934 | Johnson | 446/221 |
| 2,134,063 | 10/1938 | Turchanyi | 446/221 |
| 2,339,983 | 1/1944 | Day | 446/222 |
| 3,254,439 | 6/1966 | Hansen | |
| 3,390,491 | 7/1968 | Hayden et al. | 52/2.25 |
| 4,125,233 | 11/1978 | Winker et al. | 244/33 |
| 4,758,198 | 7/1988 | Ishiwa | 446/220 |
| 4,773,178 | 9/1988 | Marek | 43/2 |
| 4,821,444 | 4/1989 | Remus | |
| 4,829,694 | 5/1989 | Oasheim | 43/1 |
| 4,833,813 | 5/1989 | McLemore, Jr. | 43/1 |
| 5,023,118 | 6/1991 | Cheng | 446/221 |
| 5,076,029 | 12/1991 | Sevilla | 52/2.25 |
| 5,183,432 | 2/1993 | Noguchi | 446/220 |
| 5,316,605 | 5/1994 | Rakonjac et al. | 156/145 |
| 5,546,692 | 8/1996 | Byers | 43/1 |
| 5,632,110 | 5/1997 | Roy | 43/2 |

FOREIGN PATENT DOCUMENTS

| 2047568 | 1/1993 | Canada | 43/2 |
|---|---|---|---|

*Primary Examiner*—Jack W. Lavinder
*Assistant Examiner*—Darren Ark
*Attorney, Agent, or Firm*—Mary M. Moyne; Ian C. McLeod

[57] ABSTRACT

A figure (10) for use in attracting animals is described. The figure is formed by a right and left side (12 and 14) which are matched together and sealed around their outer circumference (12A and 14A) to form an airtight inner chamber (26). The sides essentially have the shape of the animal. Internal bonded sections (28A to 28F) within the circumference (10A) of the figure divide the inner chamber into smaller, interconnected air passageways (30). The figure is provided with guy wire flaps (16B) and stake flaps (16A) which allow for mounting guy wires (18) and stakes (24) on the figure in order to hold the figure in an upright position.

25 Claims, 3 Drawing Sheets

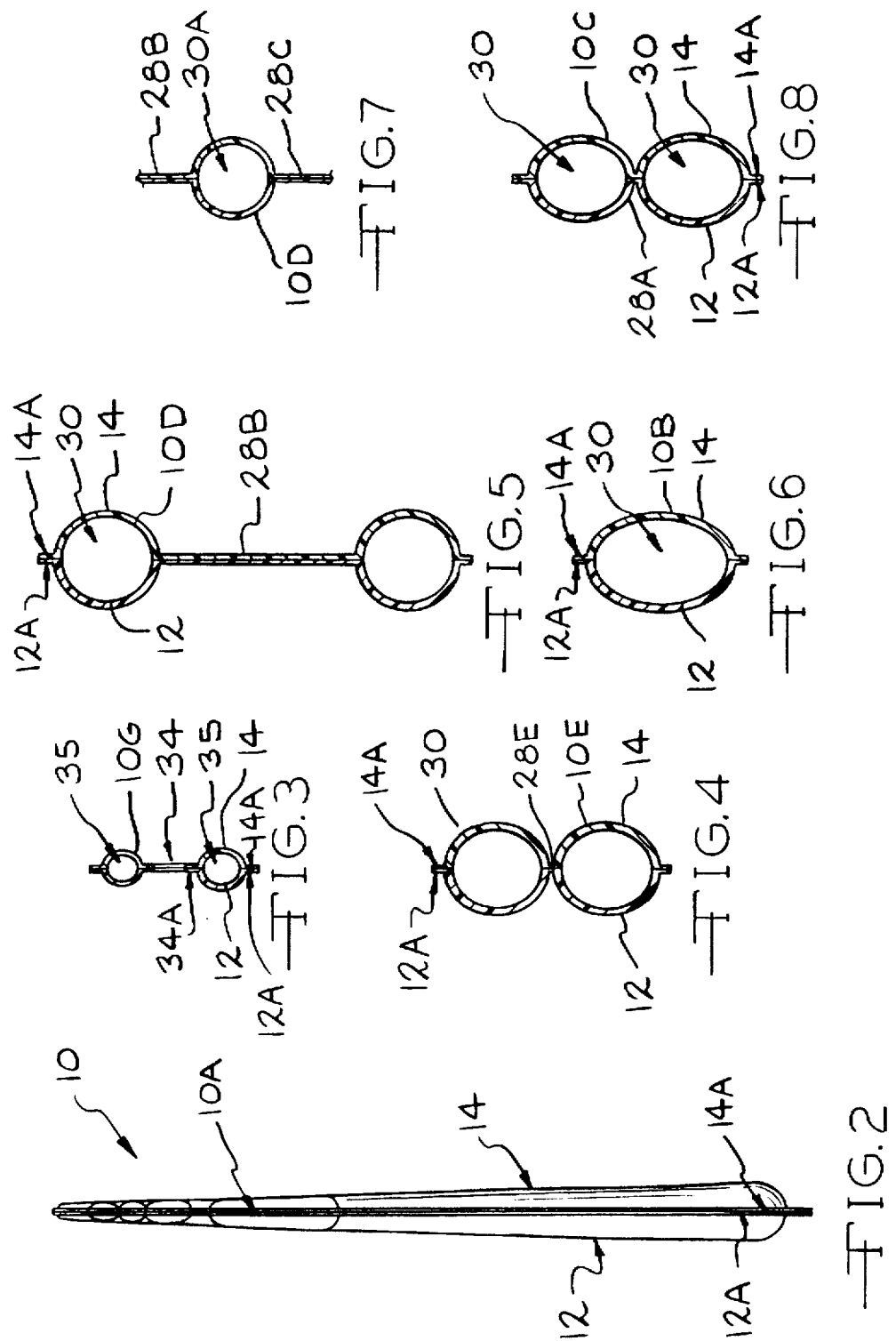

INFLATABLE FIGURE

CROSS-REFERENCE TO RELATED APPLICATION

This application is a continuation-in-part of application Ser. No. 08/514,604, filed Aug. 14, 1995, now abandoned.

BACKGROUND OF THE INVENTION

(1) Field of the Invention

The present invention relates to an inflatable figure for use in attracting animals. In particular, the present invention relates to an inflatable figure having the lateral side view appearance of the animal and having interconnected air passageways within the figure.

(2) Description of the Related Art

The related art has shown various apparatus for attracting animals. Illustrative are U.S. Pat. Nos. 4,773,178 to Marek and 4,821,444 to Remus and Canadian Application No. 2,047,568 to Nowlan.

Marek describes a portable deer decoy which is comprised of an inflatable structure having the contour and surface appearance of a deer. The structure has separate compartments with separate inflation valves.

The structure is anchored to the ground using stakes at the fore feet of the animal. The structure is also provided with a scent dispenser.

Remus describes a decoy constructed of flexible, closed-cell expanded foam. The decoy is held in the upright, standing position by two support stakes which extend through holes formed in the legs of the decoy. The decoy can either be full 3-D size or can be just a silhouette.

Nowlan describes an inflatable deer decoy.

The decoy is constructed of an inflatable material and has an air valve for inflating the decoy. The decoy has strings attached to the four legs which are used to tie the decoy to stakes driven in the ground. The decoy also has absorbent pads on each hind leg to simulate the tarsal glands of a real deer. The decoy is intended to replace three-dimensional archery targets which are used as decoys. The decoy inflates to have a thickness similar to a real deer.

Also of interest is U.S. Pat. No. 3,254,439 to Hansen which describes an inflatable duck decoy and Design Patent No. Des. 356,620 to Weber et al which shows an animal decoy. Only of minimal interest are U.S. Pat. Nos. 1,504,079 to Roberts and 2,134,063 to Turchanyi which describe inflatable toys having the shape of an animal.

There remains the need for an inflatable figure which is portable when uninflated, easy to inflate and when inflated easy to handle and set up and which will attract the intended animal.

OBJECTS

Therefore it is an object of the present invention to provide an inflatable figure which is able to be used to attract animals. Further, it is an object of the present invention to provide an inflatable figure which has the lateral side appearance or silhouette of the animal intended to be attracted. Still further, it is an object of the present invention to provide an inflatable figure which is easy to inflate and which inflates in an even manner. Further still, it is an object of the present invention to provide an inflatable figure which has a minimal thickness when inflated which allows the decoy to be easily handled and set up when inflated. Still further, it is an object of the present invention to provide an inflatable figure which is easily secured in an upright position using guy wires and stakes. Further, it is an object of the present invention to provide an inflatable figure which is lightweight and collapsible for easy transportation and storage and which is inexpensive to manufacture. These and other objects will become increasingly apparent by reference to the following drawings and the description.

BRIEF DESCRIPTION OF THE DRAWINGS

FIG. 2 is a rear end view of the FIG. 10 of FIG. 1 fully inflated showing the right side 12 and left side 14.

FIG. 3 is a cross-sectional view of FIG. 1 along the line 3—3 showing the smaller air passageways 35 in the antlers 10G.

FIG. 4 is a cross-sectional view of FIG. 1 along the line 4—4 showing the air passageways 30 in the neck 10E.

FIG. 5 is a cross-sectional view of FIG. 1 along the line 5—5 showing the air passageways 30 in the body 10D.

FIG. 6 is a cross-sectional view of the FIG. 1 along the line 6—6 showing the air passageway 30 in the front leg 10B.

FIG. 7 is a cross-sectional view of FIG. 1 along the line 7—7 showing the air passageway 30 between the attached body and rear sections 28B and 28C in the body 10D.

FIG. 8 is a cross-sectional view of FIG. 1 along the line 8—8 showing the two air passageways 30 in the back legs 10C.

DETAILED DESCRIPTION OF THE PREFERRED EMBODIMENT

Figure 1:
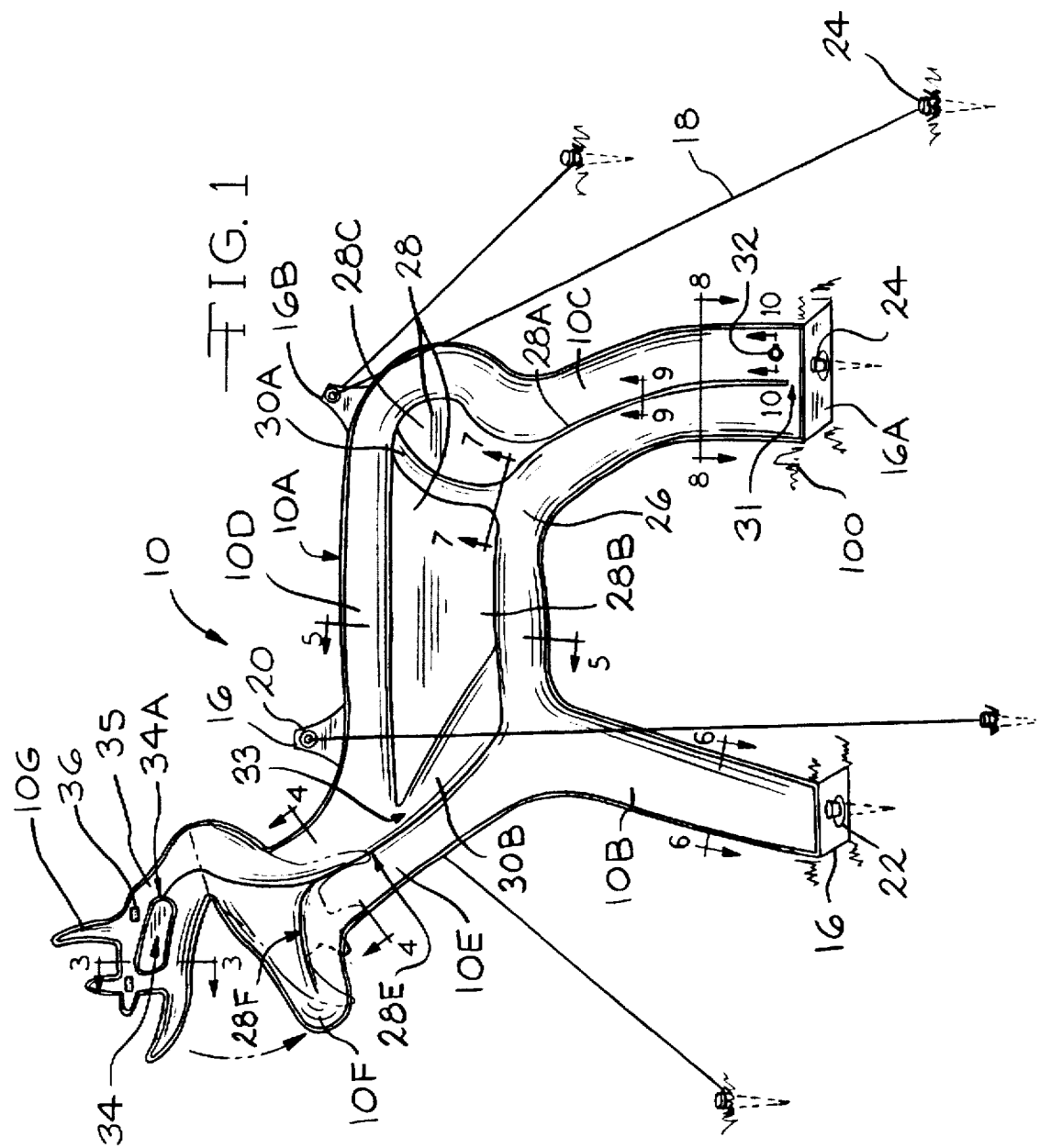
FIG. 1 is a right side view of the FIG. 10 of the present invention showing the guy wires 18, the guy flaps 16B and the stakes 24 through the stake flaps 16A.
Figure 9:
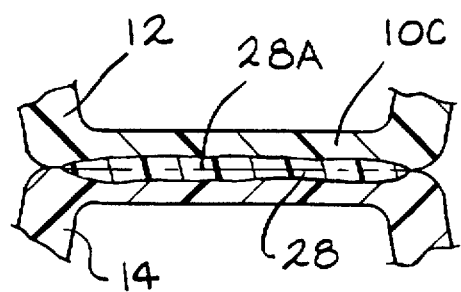
FIG. 9 is a cross-sectional view of FIG. 1 along the line 9—9 showing the right side 12 and the left side 14 bonded together.

The present invention relates to an article of manufacture for use in attracting animals, which comprises: an inflatable bag having opposed sides in lateral side view defining a circumference in a shape similar to the animal, with a head, neck, body and legs, the sides comprising opposed sheets of a material each having the same shape and attached together around the circumference and at intermediate positions within the circumference of the bag such as to form an air passageway around the circumference, the air passageway having about an equal size around the circumference to allow uniform inflation of the bag and separated at the intermediate positions by internally bonded sections which separate the air passageway into a first portion and a second portion wherein the first portion extends along a top of the body of the animal and the second portion extends along a bottom of the body of the animal wherein the portions are spaced apart along the body of the animal and are fluidly interconnected and wherein when the bag is inflated, the bag has a likeness of the animal as viewed from the side.

Further, the present invention relates to an article of manufacture for use in attracting animals, which comprises: laminated layers adjacent to each other with opposed sides in lateral side view defining a circumference in the shape of the animal with a head, neck, body and legs wherein portions of the layers around the circumference of the laminated layers provide a continuous ballooned container wherein when the bag is inflated, portions of the layers adjacent the ballooned containers in the head and neck and the body and legs are laminated together to form an air passageway around the circumference, the air passageway having about an equal size around the circumference to allow even inflation of the bag and separated at intermediate positions by internally bonded sections which separate the air passageway into a first portion and a second portion wherein the first portion extends along a top of the body of the animal and the second portion extends along a bottom of the body of the animal wherein the portions are spaced apart along the body of the animal and are fluidly interconnected and the bag has a likeness of the animal as viewed from the side.

Still further, the present invention relates to a method for attracting an animal, which comprises: providing an inflatable bag having opposed sides in lateral side view around a circumference in a shape similar to the animal with a head, neck, body and legs, the bag including layers each having the same shape and attached around the circumference and at intermediate positions within the circumference of the bag such as to form interconnected passageways within the bag wherein when the bag is inflated, an air passageway around the circumference, the air passageway having about an equal size around the circumference to allow even inflation of the bag and separated at intermediate positions by internally bonded sections which separate the air passageway into a first portion and a second portion wherein the first portion extends along a top of the body of the animal and the second portion extends along a bottom of the body of the animal wherein the portions are spaced apart along the body of the animal and are fluidly interconnected, the bag has a likeness of the animal as viewed from the side and support flaps provided on one or both layers of the bag for securing the bag to a ground surface and for holding the article in an upright position such as to simulate the animal in the upright position; inflating the bag; positioning the bag in an area within which are located the animals;

securing the bag in the upright position; and moving away from the bag and out of sight and smell of the animals.

Further still, the present invention relates to an article of manufacture for use in attracting animals, which comprises: an inflatable bag having opposed sides in lateral side view defining a circumference in a shape similar to the animal with antlers, the sides comprising opposed sheets of a material each having the same shape and attached together around and at intermediate positions within the circumference of the bag such as to form interconnected air passageways within the bag; and a fastener provided on the bag to fold the antlers of the bag down along one of the sides of the bag such that the bag resembles a female deer.

Furthermore, the present invention relates to an article of manufacture for use in attracting animals, which comprises: laminated layers adjacent to each other with opposed sides in lateral side view defining a circumference in the shape of the animal with antlers wherein portions of the layers around the circumference of the laminated layers provide a continuous ballooned container and wherein portions of the layers adjacent the ballooned container are laminated together; and a fastener provided on one of the layers to hold the antlers flat so that the circumference of the laminated layers is in the shape of the animal without antlers so as to resemble a female deer.

Finally, the present invention relates to a method for attracting an animal, which comprises: providing an inflatable bag having opposed sides in lateral side view around a circumference in a shape similar to the animal, the bag including layers each having the same shape and attached around and at intermediate positions within the circumference of the bag such as to form interconnected passageways within the bag; support flaps provided on one or both layers of the bag for securing the bag to a ground surface and for holding the article in an upright position such as to simulate the animal in the upright position; and, a fastener provided on the bag to fold the antlers of the bag down along one of the sides of the bag so that the bag resembles a female deer; inflating the bag; positioning the bag in an area within which are located the animals; securing the bag in the upright position; and moving away from the bag and out of sight and smell of the animals.

Figure 10:
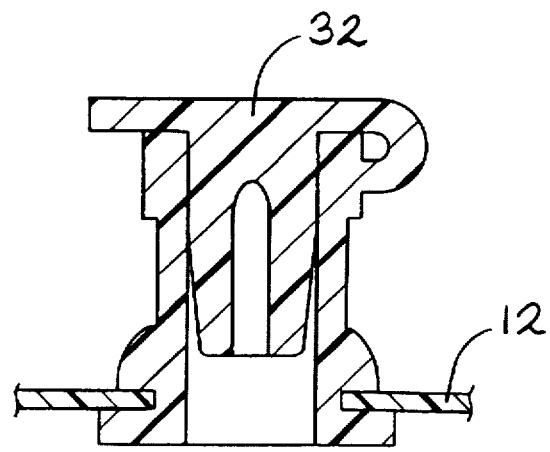
FIG. 10 is a cross-sectional view of FIG. 1 along the line 10—10 showing the inflation valve 32.

FIG. 1 shows the inflatable FIG. 10 of the present invention. The FIG. 10 is constructed of a right side 12 and a left side 14 which are bonded or laminated together. The FIG. 10 is also provided with anchoring flaps 16 for securing the FIG. 10 to the ground surface 100.

The right and left sides 12 and 14 of the FIG. 10 preferably have an outer circumference 12A and 14A in the shape of an animal. The sides 12 and 14 are preferably identical but opposite such that when the sides 12 and 14 are matched together, they form an essentially 2-dimensional FIG. 10 which appears the same when viewed from either side 12 or 14. The sides 12 and 14 are preferably a 2-D likeness of an animal as viewed from the side. Fine details of the animal can be eliminated. However, the FIG. 10 can be as detailed as the user thinks necessary. In the preferred embodiment, the FIG. 10 is a deer, as viewed from the side, having a front leg 10B and two back legs 10C and having antlers 10G. This level of detail is sufficient to attract another animal. Each of the sides 12 and 14 is between about 0.006 and 0.01 inches (0.015 and 0.025 cm) thick and are preferably constructed of a flexible polyvinyl chloride material. In the preferred embodiment, 8 mil vinyl is used to construct the FIG. 10. The outer surface of the sides 12 and 14 are preferably colored and provided with graphics or other ornamentation such as to resemble the animal and make the FIG. 10 appear more lifelike. The outer surface of the sides 12 and 14 can also be provided with bright or fluorescent colors to notify other persons that the FIG. 10 is not a real animal.

The anchoring flaps 16 are preferably provided on either the right or left side 12 or 14 of the FIG. 10. The FIG. 10 is provided with anchoring flaps 16 for securing the FIG. 10 in the upright position. In the preferred embodiment, the flaps 16 are integrally formed as part of both the right and left sides 12 and 14 and are bonded together to form a single double thick flap 16. In the preferred embodiment, there are four flaps 16; two stake flaps 16A and two guy wire flaps 16B. The stake flaps 16A are preferably adjacent the bottom of the front and back legs 10B and 10C of the FIG. 10. The guy wire flaps 16B are preferably along what is preferably the back of the animal. The guy wire flaps 16B can be positioned anywhere on the FIG. 10 as long as when the guy wires 18 are attached to the guy wire flaps 16B, the guy wires 18 act to hold the FIG. 10 in the upright position. In an alternate embodiment, the flaps 16 are integrally formed as part of the right or left side 12 or 14 of the FIG. 10. The flaps 16 can also be a separate piece which is mounted on either or both of the sides 12 or 14 or which is sandwiched between the sides 12 and 14 at the circumference 10A of the FIG. 10 and held in place by bonding the sides 12 and 14 together (to be discussed in detail hereinafter). The stake flaps 16A are preferably also provided with grommets 22 through which the stakes 24 are mounted. The guy wire flaps 16B are preferably provided with metal grommets 20 which allow for securely attaching the guy wires 18 without ripping the flaps 16 and potentially damaging the adjacent sides 12 or 14 of the FIG. 10. In the preferred embodiment, there are four guy wires 18, two extending outward from each side of the FIG. 10. There are preferably two stakes 24, one adjacent the front leg 10B and one adjacent the back leg 10C. The stakes 24 are preferably wire stakes having a loop at one end similar to those used for staking down tents. The stakes 24 are preferably between about 5.0 and 6.0 inches (12.7 and 15.2 cm) long and extend between about 4.0 and 5.0 inches (10.2 and 12.7 cm) into the ground surface 100. The stakes 24 used for the stake flaps 16A are preferably similar to the stakes 24 used to secure the guy wires 18 to the ground surface 100. The number of guy wires 18 and the size and number of stakes 24 depends on the size and weight of the FIG. 10 and also on the weather conditions (i.e. wind) of the area where the FIG. 10 is to be placed.

The sides 12 and 14 are preferably bonded together around their outer circumferences 12A and 14A such as to form the FIG. 10 having an outer circumference 10A or silhouette resembling the shape of an animal. The right and left sides 12 and 14 are preferably bonded together around their outer circumferences 12A and 14A, using heat welding. The sides 12 and 14 are preferably stamped out of sheets of polyvinyl chloride and welded together using dielectric heat in a single step during production of the FIG. 10. Other suitable means of bonding the sides 12 and 14 together such as adhesives could also be used. The bonding of the sides 12 and 14 together creates an airtight chamber 26 within the circumference 10A of the FIG. 10. The sides 12 and 14 are preferably also bonded together at internal bonded sections 28 within the circumference 10A of the FIG. 10 such as to create smaller, air passageways 30 within the FIG. 10. The bonded sections 28A to 28F preferably divide the air chamber 26 within the circumference 10A of the FIG. 10 such that all the air passageways 30 are interconnected and have essentially the same diameter (FIGS. 3 to 8). By dividing the central chamber 26 into smaller equal air passageways 30, the bonded sections 28 act to reduce the total amount of air needed to inflate the FIG. 10 and also allow for even inflation of the FIG. 10. In addition, having air passageways 30 of essentially the same size adjacent the outer circumference 10A of the FIG. 10 enables the FIG. 10 to have the shape or silhouette of the animal. In addition, the smaller air passageways 30 produce less stress on the bonded sections 28A to 28E as well as the outer circumference welds of the FIG. 10. This allows the outer circumference weld and the bonded sections 28A to 28E to be thinner where appropriate. Thinner welds are particularly helpful around the outer circumference 10A of the FIG. 10 since less material is used to form the weld which reduces the amount of uninflatable area around the circumference 10A of the FIG. 10 and reduces the weight of the FIG. 10. The sizes and locations of the bonded sections 28A to 28E also act to allow the FIG. 10 to stand erect and to maintain the shape of the animal.

In the preferred embodiment, the back legs 10C are provided with a bonded leg section 28A between the legs 10C such as to divide the legs 10C into two approximately equal diameter passageways 30. Preferably, the bonded section 28A does not extend to the very bottom of the legs 10C so as to allow a gap 31 between the two passageways 30 of the legs 10C. The gap 31 is important due to the positioning of the inflation valve 32 at the bottom of one of the back legs 10C. The valve 32 is preferably a conventional inflation valve 32 such as those used for inflating beach balls. However, any type of valve 32 can be used. In the preferred embodiment, only a single valve 32 is necessary however, additional valves 32 may be added to allow more than one person to inflate the FIG. 10 at a time. The front leg 10B of the FIG. 10 is preferably longer than the back legs 10C. The added length of the front leg 10B allows the FIG. 10 to stand upright and straight. The width of the passageway in the front leg 10B is preferably of such a size such as to not require an internal bonded section. The body 10D of the FIG. 10 is preferably provided with a body and a rear bonded section 28B and 28C. Preferably, the sections 28B and 28C are separated in the middle by a middle air passageway 30A. The middle air passageway 30A is sealed at the top and does not form a fluid passageway between the air passageways 30 around the outer circumference 10A of the FIG. 10 (FIG. 1). The middle air passageway 30A preferably allows the body 10D of the FIG. 10 to maintain its shape adjacent the back legs 10C. The middle air passageway 30A also prevents the internal bonded sections 28B and 28C from collapsing or folding which allows the FIG. 10 to maintain the shape of the animal. In addition, the separation of the sections 28B and 28C in the middle of the body 10D allows for quicker, more even inflation of the FIG. 10. The rear section 28C is preferably connected to the leg section 28A which extends downward between the rear legs 10C. The body section 28B is preferably provided with a front air passageway 30B. The front air passageway 30B is preferably located above the front leg 10B of the FIG. 10 and angles from the neck 10E of the FIG. 10 to the body 10D of the FIG. 10. The front air passageway 30B preferably has an oblong shape (FIG. 1). The front air passageway 30B preferably has an opening 33 at the top, adjacent the neck 10E of the FIG. 10. The opening 33 allows the front air passageway 30B to become inflated. In the preferred embodiment the bottom of the front air passageway 30B adjacent the body 10D of the FIG. 10 is sealed. The front air passageway 30B allows the FIG. 10 to maintain the shape of the animal. The front air passageway 30B prevents the body section 28B from folding or collapsing.

The neck 10E of the FIG. 10 is also preferably provided with an internally bonded neck section 28E which extends along the neck 10E and forms a Y-shaped section 28F in the head 10F of the FIG. 10. The internally bonded neck section 28E preferably has a nominal width and acts to divide the neck 10E into two, separate air passageways 30. The Y-shaped section 28F in the head 10F of the FIG. 10 forms an air passageway 30 around the outer circumference 10A of the head 10F and antlers 10G of the FIG. 10. The Y-shaped section 28F allows the head 10F and antlers 10G of the FIG. 10 to maintain the shape of the head 10F and antlers 10G of the animal. In the preferred embodiment, the Y-shaped section 28F extends into the nose of the FIG. 10 but does not extend to the end of the nose. Consequently, the air passageways 30 extend completely around the head 10F of the FIG. 10. In addition, by reducing the overall size of the air passageways 30 around the head 10F and antlers 10G, the pressure on the welds around the outer circumference 10A of the head 10F and antlers 10G is less which reduces weld failure and allows the welds to have a smaller width. Preferably, the antlers 10G of the FIG. 10 have a cutout portion 34 instead of a bonded section. The cutout portion 34 is bonded around the circumference 34A to maintain the sealed chamber 26. The circumference 34A of the cutout portion 34 is bonded in order to prevent air from escaping from the inner chamber 26 of the FIG. 10. The cutout portion 34 makes the antlers 10G appear as two antlers 10G from the side which allows the FIG. 10 to appear more lifelike. The cutout portion 34 is similar to the internally bonded sections 28 in that the cutout portion 34 divides the antlers 10G into small passageways 35.

In the preferred embodiment, the Y-shaped section 28F extends to and connects with the cutout portion 34 of the antlers 10G. Preferably, the diameter of the passageways 35 of the antlers 10G are smaller than the diameter of the passageways 30 in the remainder of the FIG. 10.

The antlers 10G are preferably provided with fasteners 36 which enable the antlers 10G to be folded over prior to inflation of the FIG. 10 along the side of the head 10F of the FIG. 10. The fasteners 36 can be mounted onto either side 12 or 14 of the FIG. 10. Folding over the antlers 10G, prevents the antlers 10G from becoming inflated or alternately reduces the level of inflation of the antlers 10G. This allows the FIG. 10 to resemble a female deer instead of a male deer. In the preferred embodiment, the fasteners 36 are hook and loop fasteners such as Velcro®. Alternately, a tie (not shown) can be attached and tightened around the base of the antlers 10G such as to prevent inflation of the antlers 10G. The non-inflated antlers 10G would then flop over thus, making the FIG. 10 resemble a female deer.

In the preferred embodiment, when fully inflated, the FIG. 10 is approximately between about 3.0 and 5.0 feet (91.4 and 152.4 cm) high, between about 4.0 and 6.0 feet (121.9 and 182.9 cm) long and 2.0 and 5.0 inches (5.1 and 12.7 cm) thick. Thus, the FIG. 10 remains essentially 2-dimensional even when fully inflated. The FIG. 10 preferably weighs only between about 0.3 and 1.5 lbs. when uninflated and folds up to about a 10.0×12.0 inches (25.4×30.5 cm) square. The size, weight and flexibility of the FIG. 10 allows the FIG. 10 to be easily carried by a single user and allows the FIG. 10 to be placed into the trunk or backseat of a car for easy transportation.

IN USE

In the preferred embodiment, the FIG. 10 is used to attract other animals for hunting. However, the FIG. 10 can be used to attract animals for other reasons such as to study them. To use the FIG. 10 as a decoy for attracting animals for hunting, the FIG. 10 is first inflated. Prior to inflating, the user would determine whether or not to fasten down the antlers 10G depending upon whether the FIG. 10 was to resemble a male or female deer. The FIG. 10 can be inflated orally by the user or alternately a hand pump or electric pump can be used. In the preferred embodiment, the approximately equal diameter air passageways 30 enable a single user using one valve 32 to inflate the FIG. 10 quickly and easily while achieving even and uniform inflation. Next, the FIG. 10 is secured to the ground surface 100 using the stakes 24 fastened through the grommets 20 in the stake flaps 16A. The FIG. 10 can be fastened to the ground surface 100 such that the stakes 24 are all on one side 12 or 14 of the FIG. 10 or so that the stakes 24 are on alternate sides 12 and 14 of the FIG. 10. The positioning of the stakes 24 will also depend upon whether the stake flaps 16A are integrally formed with one or both sides 12 or 14 of the FIG. 10 as it will be easy to position the flap 16A on the side 12 or 14 of the FIG. 10 to which it is attached. Alternately, a single stick or post (not shown) angled between the body 10D of the FIG. 10 and the ground surface 100 can be used to hold the FIG. 10 in the upright, standing position. Once the FIG. 10 is secured to the ground surface 100, the FIG. 10 is then raised to the upright position. Once in the upright position, the guy wires 18 are then staked into the ground surface 100. Preferably, the guy wires 18 are attached to the guy wire flaps 16B prior to moving the FIG. 10 to the upright position. In the preferred embodiment, the guy wires 18 are secured in a diagonal fashion such that if the first guy wire secured is on the left side 14 of the FIG. 10 adjacent the rear of the FIG. 10, the second guy wire attached would be on the right side 12 of the FIG. 10 adjacent the front of the FIG. 10. The remaining two guy wires 18 would be secured similarly. The minimal thickness and the lightweight of the FIG. 10 allow the FIG. 10, when fully inflated, to be easily handled and moved by a single person. The easy set up of the FIG. 10 enables a single user to set up the FIG. 10 without assistance. Once in place, the user then moves away from the FIG. 10. To store the FIG. 10 after use, the guy wires 18 and stakes 24 are first removed from the ground surface 100. Next, the air is removed from the FIG. 10 by opening the valve 32. The uninflated FIG. 10 is then easily folded into a small size for storage.

It is intended that the foregoing description be only illustrative of the present invention and that the present invention be limited only by the hereinafter appended claims.

I claim:

1. An article of manufacture for use in attracting an animal, which comprises:

(a) an inflatable bag having opposed sides, each side having a foldable antler portion, the sides in lateral side view defining a circumference in a shape similar to the animal, the sides comprising opposed sheets of a material each having a same shape and attached together around and at intermediate positions within the circumference of the bag such as to form interconnected air passageways within the bag wherein a portion of the bag defined by the antler portion of the sides has narrow air passageways; and (b) a fastening means mounted on one of the sides adjacent the antler portion to hold the portion of the bag defined by the antler portion of the sides down along one of the opposed sides of the bag wherein when the antler portion of the sides is folded and hold by the fastening means, the air passageways in the portion of the bag defined by the antler portion of the sides do not inflate and in lateral side view the sides define a circumference in a shape similar to the animal without antlers, wherein when the antler portion of the sides is not held in the folded position by the fastening means, the air passageways in the portion of the bag defined by the antler portion of the sides inflates and in lateral side view the sides define a circumference in a share similar to the animal with antlers.

2. A method for attracting an animal, which comprises:

(a) providing an inflatable bag having opposed sides, each side having a foldable antler portion, the sides in lateral side view defining a circumference in a shape similar to the animal, the bag including layers each having a same shape and attached around and at intermediate positions within the circumference of the bag such as to form interconnected passageways having a single inflation valve within the bag; support flaps being provided on one or both layers of the bag for securing the bag to a ground surface and for holding the article in an upright position such as to simulate the animal in the upright position; and a fastener mounted on one of the sides adjacent the antler portion of the bag to fold a portion of the bag defined by the antler portion down along one of the opposed sides of the bag;

(b) folding the portion of the bag defined by the antler portion of the sides and fastening the portion to the fastening means such that in lateral side view the circumference has a shape similar to the animal without antlers;

(c) evenly inflating the bag using the single inflation valve to inflate the interconnected passageways;

(d) positioning the bag in an area within which the animal to be attracted is located;

(e) securing the bag by the support flags in the upright position; and (f) moving away from the bag and out of sight and smell of the animal to be attracted.

3. An article of manufacture for use in attracting an animal, which comprises:

(a) laminated layers adjacent to each other with opposed sides, each side having a foldable antler portion, the sides in lateral side view defining a circumference in a shape of the animal wherein portions of the layers around the circumference of the laminated layers provide a continuous ballooned container and wherein portions of the layers adjacent the ballooned container are laminated together wherein a portion of the container defined by the antler portion of the sides has narrow air passageways; and (b) a fastening means mounted on one of the sides adjacent the antler portion to hold the portion defined by the antler portion down along one of the opposed sides adjacent the antler portion, wherein when the antler portion of the sides is folded and held by the fastening means, the air passageways in the portion of the container defined by the antler portion of the sides do not inflate and in lateral side view the sides define a circumference in a shape similar to the animal without antlers, wherein when the antler portion of the sides is not held in the folded position by the fastening means, the air passageways in the portion of the container defined by the antler portion of the sides inflates and in lateral side view the sides define a circumference in a shape similar to the animal with antlers.

4. A method for attracting an animal, which comprises:

(a) providing an inflatable bag having opposed sides in lateral side view around a circumference in a shape similar to the animal with a head, a neck having opposed ends and connected at one and to the head, a body having opposed ends with opposed top and bottom extending between the ends and connected at one and to the other end of the neck and legs connected on the bottom of the body adjacent each of the ends of the body and extending outward from the bottom of the body, the bag including layers each having a same shape and attached around the circumference and at intermediate positions within the circumference of the bag such as to form interconnected passageways having a single inflation valve within the bag wherein when the bag is inflated, an air passageway is formed around the circumference, the air passageway having an inner diameter about an equal size around the circumference of the bag to allow even inflation of the bag and separated at intermediate positions by internally bonded sections which separate the air passageway into a first portion, a second portion, a third portion and a fourth portion wherein the first portion extends along the top of the body of the animal and the second portion extends along the bottom of the body of the animal wherein the first and second portions are spaced apart by a first internally bonded section along the body of the animal and are fluidly interconnected, wherein the third portion is in fluid communication with the first portion and extends across the body of the animal toward the second portion adjacent one end of the first internally bonded section, wherein the fourth portion is in fluid communication with the second portion and extends across the body of the animal toward the first portion adjacent an other end of the first internally bonded section, the bag has a likeness of the animal as viewed from a side of the animal and support flaps are provided on one or both layers of the bag for securing the bag to a ground surface and for holding the article in an upright position such as to simulate the animal in the upright position;

(b) evenly inflating the bag using the single inflation valve to inflate the first and second portions of the air passageway;

(c) positioning the bag in an area within which the animal to be attracted is located;

(d) securing the bag in the upright position by inserting stakes through the sides at an end of the legs opposite the body and extending tie down lines between the top of the body and a ground surface wherein the third and fourth portions prevent the bag from folding and enable the bag to maintain an upright position; and (e) moving away from the bag and out of sight and smell of the animal to be attracted.

5. An article of manufacture for use in attracting an animal, which comprises:

(a) laminated layers adjacent to each other with opposed sides in lateral side view defining a circumference in a shape of the animal with a head, A neck having opposed ends and connected at one end to the head a body having opposed ends with opposed top and bottom extending between the ends and connected at one and to the other end of the neck and legs connected on the bottom of the body adjacent each of the ends of the body and extending outward from the bottom of the body, wherein portions of the layers around the circumference of the laminated layers provide a continuous ballooned container wherein when the container is inflated, portions of the layers adjacent the ballooned containers in the head and neck and the body and legs are laminated together to form an air passageway around the circumference, the air passageway having an inner diameter about an equal size around the circumference of the container to allow even inflation of the container and separated at intermediate positions by internally bonded sections which separate the air passageway into a first portion, a second portion, a third portion and a fourth portion wherein the first portion extends along the top of the body of the animal and the second portion extends along the bottom of the body of the animal wherein the first and second portions have inner diameters of similar size which are equal in size to the inner diameter of the air passageway around the circumference and, are spaced apart by a first internally bonded section along the body of the animal and are fluidly interconnected, wherein the third portion is fluidly interconnected with the first portion and extends across the body of the animal toward the second portion adjacent one and of the first internally bonded section, wherein the fourth portion is fluidly interconnected with the second portion and extends across the body of the animal toward the first portion adjacent an other and of the first internally bonded section, wherein the third and fourth portions prevent the body of the animal from folding over along the internally bonded sections extending across the body of the animal and the container has a likeness of the animal as viewed from a side of the animal.

6. The article of claim 17 wherein support flaps extend from one or both of the layers adjacent the circumference of the laminated layers.

7. The article of claim 18 wherein the support flaps include stake flaps provided on the layers adjacent the ground surface and guy wire flaps with grommets provided on the layers spaced above the ground surface.

8. The article of claim 17 wherein the layers are approximately between about 0.015 and 0.025 cm thick.

9. The article of claim 17 wherein the continuous ballooned container is approximately between 91.4 and 152.4 cm high, 121.9 and 182.9 cm long and between about 5.1 and 12.7 cm thick when fully inflated.

10. The article of claim 17 wherein the animal is a deer with antlers.

11. An article of manufacture for use in attracting an animal, which comprises:

(a) an inflatable bag having opposed sides in lateral side view defining a circumference of the bag in a shape similar to the animal, with a head, a neck having opposed ends and connected at one end to the head, a body having opposed ends with opposed top and bottom extending between the ends and connected at one and to the other end of the neck and leas connected on the bottom at the body adjacent each of the ends of the body and extending outward from the bottom of the body, the sides comprising opposed sheets of a material each having a same shape and attached together around the circumference and at intermediate positions within the circumference of the bag such as to form an air passageway around the circumference, the air passageway having an inner diameter about an equal size around the circumference of the bag to allow uniform inflation of the bag and separated at the intermediate positions by internally bonded sections which separate the air passageway into a first portion, a second portion, a third portion and a fourth portion wherein the first portion extends along the top of the body of the animal and the second portion extends along the bottom of the body of the animal wherein the first and second portions have an inner diameter of similar size which are equal in size to the inner diameter of the air passageway around the circumference and are spaced apart by a first internally bonded section along the body of the animal and are fluidly interconnected, wherein the third portion is fluidly interconnected with the first portion and extends across the body of the animal toward the second portion adjacent one and of the first internally bonded section, wherein the fourth portion is fluidly interconnected with the second portion and extends across the body of the animal toward the first portion adjacent an other end of the first internally bonded section, wherein the third and fourth portions prevent the body of the animal from folding over along the internally bonded sections extending across the body of the animal and wherein when the bag is inflated, the bag has a likeness of the animal as viewed from a side of the animal.

12. The article of claim 1 wherein the internally bonded sections are uninflated.

13. The article of claim 1 wherein the internally bonded sections include a back section and a middle section.

14. The article of claim 3 wherein the back section and the middle section are spaced apart by the fourth portion which prevents the back section and the middle section from collapsing.

15. The article of claim 3 wherein the middle section includes an uninflated portion and an inflated portion.

16. The article of claim 5 wherein the third portion is the inflated portion and is adjacent the neck of the animal and prevents the middle section from collapsing.

17. The article of claim 1 wherein the neck of the animal has an internally bonded section which has a minimal width.

18. The article of claim 1 wherein the head of the animal has an internally bonded section which has a Y-shape and has a minimal width.

19. The article of claim 1 wherein the bag is between about 5.1 and 12.7 cm thick between the sheets of the material when fully inflated.

20. The article of claim 1 wherein the animal is a deer with antlers.

21. The article of claim 1 wherein support flaps are provided on one or both layers of the bag for securing the bag to a ground surface and for holding the article in an upright position such as to simulate the animal.

22. The article of claim 12 wherein the support flaps are integrally formed as part of both layers.

23. The article of claim 1 wherein the animal has one front leg and two rear legs with each of the legs provided with a separate air passageway.

24. The article of claim 14 wherein the front leg of the animal is longer than the rear legs of the animal to enable the animal to stand upright and level.

25. The article of claim 1 wherein the bag is approximately between about 91.4 and 152.4 cm high and between about 121.9 and 182.9 cm long when fully inflated.

* * * * *

UNITED STATES PATENT AND TRADEMARK OFFICE
CERTIFICATE OF CORRECTION

PATENT NO. : 5,797,208
DATED : August 25, 1998
INVENTOR(S) : Roger C. Lessa

It is certified that error appears in the above—identified patent and that said Letters Patent is hereby corrected as shown below:

Column 2, line 11, "FIG. 10" should be --figure 10--.

Column 2, line 14, "FIG. 10" should be --figure 10--.

Column 4, line 15, "FIG. 10" should be --figure 10--.

Column 4, line 16, "FIG. 10" should be --figure 10--.

Column 4, line 18, "FIG. 10" should be --figure 10--.

Column 4, line 19, "FIG. 10" should be --figure 10--.

Column 4, line 24, "FIG. 10" should be --figure 10--.

Column 4, line 27, "FIG. 10" should be --figure 10--.

Column 4, line 29, "FIG. 10" should be --figure 10--.

Column 4, line 36, "FIG. 10" should be --figure 10--.

Column 4, line 39, "FIG. 10" should be --figure 10--.

Column 4, line 41, "FIG. 10" should be --figure 10--.

Column 4, line 44, "FIG. 10" (both occurrences) should be --figure 10--.

Column 4, line 45, "FIG. 10" should be --figure 10--.

UNITED STATES PATENT AND TRADEMARK OFFICE
CERTIFICATE OF CORRECTION

PATENT NO.   : 5,797,208
DATED        : August 25, 1998
INVENTOR(S)  : Roger C. Lessa It is certified that error appears in the above—identified patent and that said Letters Patent is hereby corrected as shown below:

```
Column 4, line 52, "FIG. 10" should be --figure 10--.
Column 4, line 55, "FIG. 10" should be --figure 10--.
Column 4, line 57, "FIG. 10" should be --figure 10--.
Column 4, line 59, "FIG. 10" should be --figure 10--.
Column 4, line 63, "FIG. 10" should be --figure 10--.
Column 5, line 3,  "FIG. 10" should be --figure 10--.
Column 5, line 5,  "FIG. 10" should be --figure 10--.
Column 5, line 16, "FIG. 10" should be --figure 10--.
Column 5, line 17, "FIG. 10" should be --figure 10--.
Column 5, line 20, "FIG. 10" should be --figure 10--.
Column 5, line 26, "FIG. 10" should be --figure 10--.
Column 5, line 30, "FIG. 10" should be --figure 10--.
Column 5, line 32, "FIG. 10" should be --figure 10--.
Column 5, line 33, "FIG. 10" should be --figure 10--.
Column 5, line 35, "FIG. 10" should be --figure 10--.
```

UNITED STATES PATENT AND TRADEMARK OFFICE
CERTIFICATE OF CORRECTION

PATENT NO. : 5,797,208
DATED : August 25, 1998
INVENTOR(S) : Roger C. Lessa

It is certified that error appears in the above—identified patent and that said Letters Patent is hereby corrected as shown below:

Column 5, line 40, "FIG. 10" should be --figure 10--.

Column 5, line 41, "FIG. 10" should be --figure 10--.

Column 5, line 43, "FIG. 10" (both occurrences) should be --figure 10--.

Column 5, line 47, "FIG. 10" should be --figure 10--.

Column 5, line 50, "FIG. 10" should be --figure 10--.

Column 5, line 52, "FIG. 10" should be --figure 10--.

Column 5, line 53, "FIG. 10" should be --figure 10--.

Column 5, lines 55-56, "FIG. 10" should be --figure 10--.

Column 6, line 2, "FIG. 10" should be --figure 10--.

Column 6, line 3, "FIG. 10" should be --figure 10--.

Column 6, lines 4 and 5, "FIG. 10" should be --figure 10--.

Column 6, line 8, "FIG. 10" should be --figure 10--.

Column 6, line 13, "FIG. 10" should be --figure 10--.

Column 6, line 14, "FIG. 10" should be --figure 10--.

Column 6, lines 17-18, "FIG. 10" should be --figure 10--.

UNITED STATES PATENT AND TRADEMARK OFFICE
CERTIFICATE OF CORRECTION

PATENT NO. : 5,797,208
DATED : August 25, 1998
INVENTOR(S) : Roger C. Lessa

It is certified that error appears in the above—identified patent and that said Letters Patent is hereby corrected as shown below:

Column 6, line 21, "FIG. 10" should be --figure 10--.

Column 6, line 25, "FIG. 10" should be --figure 10--.

Column 6, line 26, "FIG. 10" should be --figure 10--.

Column 6, line 27, "FIG. 10" should be --figure 10--.

Column 6, line 30, "FIG. 10" should be --figure 10--.

Column 6, line 33, "FIG. 10" should be --figure 10--.

Column 6, line 34, "FIG. 10" should be --figure 10--.

Column 6, line 37, "FIG. 10" should be --figure 10--.

Column 6, line 40, "FIG. 10" should be --figure 10--.

Column 6, line 43, "FIG. 10" should be --figure 10--.

Column 6, line 45, "FIG. 10" should be --figure 10--.

Column 6, lines 46 and 47, "FIG. 10" should be --figure 10--.

Column 6, line 49, "FIG. 10" should be --figure 10--.

Column 6, line 52, "FIG. 10" should be --figure 10--.

Column 6, line 57, "FIG. 10" should be --figure 10--.

UNITED STATES PATENT AND TRADEMARK OFFICE
CERTIFICATE OF CORRECTION

PATENT NO. : 5,797,208  
DATED : August 25, 1998  
INVENTOR(S) : Roger C. Lessa

Page 5 of 11

It is certified that error appears in the above—identified patent and that said Letters Patent is hereby corrected as shown below:

Column 6, line 62, "FIG. 10" should be --figure 10--.

Column 6, line 64, "FIG. 10" should be --figure 10--.

Column 7, line 5, "FIG. 10" should be --figure 10--.

Column 7, line 8, "FIG. 10" should be --figure 10--.

Column 7, line 9, "FIG. 10" should be --figure 10--.

Column 7, line 10, "FIG. 10" should be --figure 10--.

Column 7, line 13, "FIG. 10" should be --figure 10--.

Column 7, line 19, "FIG. 10" should be --figure 10--.

Column 7, lines 20 and 21, "FIG. 10" should be --figure 10--.

Column 7, line 24, "FIG. 10" should be --figure 10--.

Column 7, line 25, "FIG. 10" should be --figure 10--.

Column 7, line 28, "FIG. 10" should be --figure 10--.

Column 7, line 29, "FIG. 10" should be --figure 10--.

Column 7, line 30, "FIG. 10" should be --figure 10--.

Column 7, line 34, "FIG. 10" should be --figure 10--.

UNITED STATES PATENT AND TRADEMARK OFFICE
CERTIFICATE OF CORRECTION

PATENT NO. : 5,797,208
DATED : August 25, 1998
INVENTOR(S) : Roger C. Lessa

It is certified that error appears in the above—identified patent and that said Letters Patent is hereby corrected as shown below:

Column 7, line 35, "FIG. 10" should be --figure 10--.

Column 7, line 37, "FIG. 10" should be --figure 10--.

Column 7, line 38, "FIG. 10" should be --figure 10--.

Column 7, line 40, "FIG. 10" should be --figure 10--.

Column 7, line 41, "FIG. 10" should be --figure 10--.

Column 7, line 45, "FIG. 10" should be --figure 10--.

Column 7, line 46, "FIG. 10" should be --figure 10--.

Column 7, line 48, "FIG. 10" should be --figure 10--.

Column 7, line 50, "FIG. 10" should be --figure 10--.

Column 7, line 51, "FIG. 10" should be --figure 10--.

Column 7, line 54, "FIG. 10" should be --figure 10--.

Column 7, line 55, "FIG. 10" should be --figure 10--.

Column 7, line 57, "FIG. 10" should be --figure 10--.

Column 7, line 58, "FIG. 10" should be --figure 10--.

Column 7, line 59, "FIG. 10" should be --figure 10--.

UNITED STATES PATENT AND TRADEMARK OFFICE
CERTIFICATE OF CORRECTION

PATENT NO. : 5,797,208
DATED : August 25, 1998
INVENTOR(S) : Roger C. Lessa

It is certified that error appears in the above—identified patent and that said Letters Patent is hereby corrected as shown below:

Column 7, line 60, "FIG. 10" should be --figure 10--.

Column 7, line 64, "FIG. 10" should be --figure 10--.

Column 7, line 67, "FIG. 10" (both occurrences) should be --figure 10--.

Column 8, line 2, "FIG. 10" (both occurrences) should be --figure 10--.

Column 8, line 4, "FIG. 10" should be --figure 10--.

Column 8, lines 4-5, "FIG. 10" should be --figure 10--.

Column 8, line 6, "FIG. 10" should be --figure 10--.

Column 8, line 7, "FIG. 10" should be --figure 10--.

Column 8, line 8, "FIG. 10" should be --figure 10--.

Column 8, line 9, "FIG. 10" should be --figure 10--.

Column 8, line 11, "FIG. 10" should be --figure 10--.

Column 8, line 12, "FIG. 10" should be --figure 10--.

Column 8, line 36 (Claim 1), "hold by the" should be --held by the--.

UNITED STATES PATENT AND TRADEMARK OFFICE
CERTIFICATE OF CORRECTION

PATENT NO.   : 5,797,208
DATED        : August 25, 1998
INVENTOR(S)  : Roger C. Lessa It is certified that error appears in the above—identified patent and that said Letters Patent is hereby corrected as shown below:

Column 8, line 45 (Claim 1), "in a share" should be --in a shape--.

Column 9, line 5 (Claim 2(e)), "support flags" should be --support flaps--.

Column 9, line 41 (Claim 4(a)), "at one and" should be --at one end--.

Column 9, line 44 (Claim 4(a)), "and to the other" should be --end to the other--.

Column 10, line 31 (Claim 5), "at one and" should be --at one end--.

Column 10, line 58 (Claim 5), "one and of" should be --one end of--.

Column 10, line 61 (Claim 5), "an other and" should be --an other end--.

Column 11, line 1 (Claim 6), "article of Claim 17" should be --article of Claim 5--.

Column 11, line 4 (Claim 7), "article of Claim 18" should be --article of Claim 16--.

Column 11, line 8 (Claim 8), "article of Claim 17" should be --article of Claim 5--.

UNITED STATES PATENT AND TRADEMARK OFFICE
CERTIFICATE OF CORRECTION

PATENT NO. : 5,797,208
DATED : August 25, 1998
INVENTOR(S) : Roger C. Lessa

It is certified that error appears in the above—identified patent and that said Letters Patent is hereby corrected as shown below:

Column 11, line 10 (Claim 9), "article of Claim 17" should be --article of Claim 5--.

Column 11, line 14 (Claim 10), "article of Claim 17" should be --article of Claim 5--.

Column 11, line 24 (Claim 11), "and to the other" should be --end to the other--.

Column 11, line 24 (Claim 11), "leas" should be --legs--.

Column 11, line 48 (Claim 11), "adjacent one and" should be --adjacent one end--.

Column 12, line 10 (Claim 12), "article of Claim 1" should be --article of Claim 11--.

Column 12, line 12 (Claim 13), "article of Claim 1" should be --article of Claim 11--.

Column 12, line 14 (Claim 14), "article of Claim 3" should be --article of Claim 13--.

Column 12, line 18 (Claim 15), "article of Claim 3" should be --article of Claim 13--.

Column 12, line 20 (Claim 16), "article of Claim 5" should be --article of Claim 15--.

UNITED STATES PATENT AND TRADEMARK OFFICE
CERTIFICATE OF CORRECTION

PATENT NO. : 5,797,208
DATED : August 25, 1998
INVENTOR(S) : Roger C. Lessa

It is certified that error appears in the above—identified patent and that said Letters Patent is hereby corrected as shown below:

Column 12, line 23 (Claim 17), "article of Claim 1" should be --article of Claim 11--.

Column 12, line 25 (Claim 18), "article of Claim 1" should be --article of Claim 11--.

Column 12, line 28 (Claim 19), "article of Claim 1" should be --article of Claim 11--.

Column 12, line 31 (Claim 20), "article of Claim 1" should be --article of Claim 11--.

Column 12, line 33 (Claim 21), "article of Claim 1" should be --article of Claim 11--.

Column 12, line 37 (Claim 22), "article of Claim 12" should be --article of Claim 21--.

Column 12, line 39 (Claim 23), "article of Claim 1" should be --article of Claim 11--.

Column 12, line 42 (Claim 24), "article of Claim 14" should be --article of Claim 23--.

UNITED STATES PATENT AND TRADEMARK OFFICE
CERTIFICATE OF CORRECTION

PATENT NO. : 5,797,208
DATED : August 25, 1998
INVENTOR(S) : Roger C. Lessa

It is certified that error appears in the above-identified patent and that said Letters Patent is hereby corrected as shown below:

Column 12, line 45 (Claim 25), "article of Claim 1" should be --article of Claim 11-.

Signed and Sealed this

Twenty-third Day of March, 1999

Attest:

Q. TODD DICKINSON

*Attesting Officer*  *Acting Commissioner of Patents and Trademarks*